(12) United States Patent
Morel et al.

(10) Patent No.: US 6,761,830 B1
(45) Date of Patent: Jul. 13, 2004

(54) METHOD FOR MAKING M- TYPE HEXAFERRITE POWDERS OR WAFERS

(75) Inventors: Antoine Morel, Evreux (FR); Eric Brando, Laredo, TX (US); Philippe Tenaud, Bernin (FR)

(73) Assignee: Ugimag S.A., Saint Pierre d'Allevard (FR)

( * ) Notice: Subject to any disclaimer, the term of this patent is extended or adjusted under 35 U.S.C. 154(b) by 23 days.

(21) Appl. No.: 09/926,781

(22) PCT Filed: Jul. 3, 2000

(86) PCT No.: PCT/FR00/01880

§ 371 (c)(1),
(2), (4) Date: Feb. 15, 2002

(87) PCT Pub. No.: WO01/02300

PCT Pub. Date: Jan. 11, 2001

(30) Foreign Application Priority Data

Jul. 5, 1999 (FR) .............................. 99 08886
Aug. 4, 1999 (FR) .............................. 99 10295

(51) Int. Cl.⁷ ........................... G11B 5/706; H01F 1/11; H01F 1/34; H01F 1/36
(52) U.S. Cl. ............................... 252/62.62; 252/62.63; 252/62.57
(58) Field of Search .......................... 252/62.62, 62.63, 252/62.57

(56) References Cited

U.S. PATENT DOCUMENTS 3,509,057 A * 4/1970 Greger .................... 252/62.56
3,766,642 A * 10/1973 Schlaudt et al. ............ 264/611
4,414,124 A * 11/1983 Endo et al. ............... 252/62.63

FOREIGN PATENT DOCUMENTS

DE          43 30 197 A       3/1995

* cited by examiner

Primary Examiner—C. Melissa Koslow
(74) Attorney, Agent, or Firm—Dennison, Schultz, Dougherty & Macdonald

(57) ABSTRACT

A method for manufacturing type M hexaferrite powders fo the formula $AFe_{12}O_{19}$ where A is Ba, Sr, Ca, Pb or a mixture thereof. An iron oxide $Fe_2O_3$ and a compound A are mixed with a molar ratio $n=Fe_2O_3/AO$, formed and calcined, and the agglomerates which result from the calcining are ground to obtain a fine ferrite powder. The mixture is formed with a ratio n ranging between 5.7 and 6.1, and with a predetermined degree of homogeneity, and before or during the grinding process, an agent controlling the microstructure is introduced.

17 Claims, No Drawings

METHOD FOR MAKING M- TYPE HEXAFERRITE POWDERS OR WAFERS

This invention relates to the field of powders or cakes of M type hexaferrites, that is to say constituted of particles of magnetoplumbite of general formula $AFe_{12}O_{19}$ where typically A represents Ba, Sr, Ca, Pb, the element A and/or Fe being able to be partly substituted by other chemical elements.

These powders are used to manufacture ceramic magnets by compression with orientation of the particles under a magnetic field, and then sintering of oriented and compressed particles.

These powders can also be used in the production of magnetic recording media.

STATE OF THE ART

The usual method for manufacturing powders of ferrite particles is as follows:
- the raw materials are provided in the form of powders, typically iron oxide $Fe_2O_3$ and strontium carbonate $SrCO_3$ in the case where A represents Sr,
- the powders are mixed with excess Sr relative to the formula of the ferrite, typically a molar ratio $Fe_2O_3/SrO$ of about 5.5 instead of 6, a ratio which corresponds to the M phase formula ($SrFe_{12}O_{19}$), and possibly after incorporating additives,
- the powder mixture is shaped, usually by granulation, or powder compression,
- type M ferrite is formed by calcination of the powder granules in an oven at about 1200° C., and after cooling, ferrite granules are obtained, typically with an apparent density $d_a$ of at least 4, that is a porosity typically lower than 20% compared to that of an M ferrite of Sr of density $d_x$ equal to 5.11.
- the calcinated granules are ground in several stages, with a first rough grinding followed by one or several fine grindings, comprising classification by particle size, the final ferrite powder obtained being exempt of any big aggregates constituted of primary particles (elementary particles), even fine ones.

It is to be noted that in this process, an excess of Sr is used, which leads to the formation of a second liquid phase, which facilitates the calcination reaction and makes the process less difficult to implement. But in this case, it is generally necessary to add silica to limit crystalline growth.

Afterwards, in the case of production of magnets, the fine powder obtained is shaped, to the form of the final magnet, after being dispersed, with orientation of the primary particles under magnetic field and compression.

The compressed product is then dried, sintered and if necessary machined to the required dimensions.

POSSIBLE PROBLEMS

The final performances or final magnetic properties obtained, typically the remanence Br or coercive force HcJ, depend in particular directly on the morphology of the ferrite particles, the remanence Br depending in particular on the ability of the primary particles to be aligned in parallel, and the coercive field HcJ depending in particular on the size and shape of the particles.

Thus, the presence of aggregates formed of primary particles aligned randomly is greatly detrimental for obtaining high magnetic properties, the aggregates being polycrystalline and formed of particles oriented in a haphazard way.

The grinding phase of the state of the art method is thus an important stage of the method, both because of its length and because of its cost, including investments, and through its consequences concerning the final properties of the magnets.

The principal problems associated with this grinding are as follows:
- on the one hand, as calcinated ferrites are difficult to grind, one observes significant wear of the grinding equipment and also ferrite pollution by outside elements from the grinding media, which have negative effects on the magnetic properties;
- on the other hand, since the elementary particles are very difficult to separate, the final grinding stage is very long—and consequently there is a high proportion of smalls (particles of particle size lower than 0.3 µm), with negative effects, both concerning the shaping of the ferrite powder for forming magnets, and concerning the possibility of aligning these low dimension particles under a magnetic field, or furthermore the possibility of reagglomeration of smalls, the high possibility of recrystallisation during sintering etc . . .

The consequences are a lowering of the final magnetic properties, the values of Br and HcJ and/or the square appearance of the demagnetisation curve.

Furthermore, taking into account the difficulty of grinding the ferrite, at this stage it is no longer possible to modify the size and/or shape of the elementary particles during this phase of grinding.

The applicant therefore sought a way of making the usual production method more economical and more efficient, while still remaining close, to present technology.

DESCRIPTION OF THE INVENTION

According to the invention, the method for manufacturing M type hexaferrite powders or cakes, of formula $AFe_{12}O_{19}$, A and Fe being able to be partially substituted, where A refers to a metal chosen among Ba, Sr, Ca, Pb, or their mixture in which:

a) an iron oxide $Fe_2O_3$ and an A compound are provided, usually under the form of powders, and a mixture is made of said iron oxide and said A compound, with a molar ratio $n=Fe_2O_3/AO$, b) the said mixture is shaped in the form of agglomerates of shape and size adapted to the calcination stage, and these are calcinated in an oven, usually between 1100° C. and 1300° C., in such a way as to form the type M ferrite, c) said calcinated agglomerates are ground to obtain a fine ferrite powder, is characterised in that at the previous stage a) of said calcination:
1) said mixture is formed with a ratio n comprised between 5.7 and 6.1,
2) simultaneously with the formation of said mixture or after this, said mixture is ground, so as to have both a mixture with a degree of homogeneity at least equal to a predetermined threshold, and an average particle size of predetermined value comprised between 0.25 and 1 µm,
3) before or during said grinding, one introduces into said mixture an agent for controlling the microstructure (ACM), at stage b), the calcination conditions together with the nature and content of ACM are chosen in order to obtain, at the end of the calcination phase, a ferrite material under the form of a porous cake also having the following properties:

a transformation yield in crystallised M ferrite greater than 95%, an apparent density $d_a$ lower than 3.5 and, preferably, lower than 3, or a porosity higher than 30% and preferably higher than 40%, low cohesion energy at the grain boundaries between primary particles leading to high brittleness, in order to replace the grinding of stage c) by a simple dispersion of said cake.

The invention thus relates to a combination of essential means.

A first essential means is a choice of ratio n very much higher than the value normally used (5.5). A value n as low as this is used so that a 2nd liquid phase is formed with excess Sr (in the case of a Sr ferrite), this formation of a 2nd liquid phase facilitating the total formation reaction of the ferrite and its crystallisation favouring good anisotropy, which makes the process relatively easy to implement on an industrial scale. But, on the contrary, this 2nd liquid phase has a tendency to weld the primary particles together, making later grinding long and difficult.

The risk associated with a value of n higher than the normal value is an incomplete reaction and poor crystallisation of the ferrite.

The means of the invention thus make it possible to obtain both a ratio n close to stoichiometry (n=6), that is to say to reduce to the minimum the presence of a 2nd liquid phase, while still obtaining a high ferrite transformation yield and a crystallisation sufficient for high anisotropy for the ferrite particles obtained.

A second means is constituted of the formation of a mixture of $Fe_2O_3$ and the compound of A with a predetermined and high degree of homogeneity, a mixture associated most often with a third grinding means. In practice, several samples are taken from the mixture, typically 3, generally during the grinding, and these samples are calcinated under standard laboratory conditions.

A mixture is considered satisfactory when one obtains a determined crystallised ferrite yield under these standard conditions. For example, it can be established by tests that a sample leading to a yield of at least 80% in crystallised ferrite with calcination at 1125° C. during 30 minutes, will lead to a yield of at least 95% under industrial calcination conditions.

Most often, and especially when one wishes to obtain a ferric oxide of a low particle size (0.6 $\mu$m or less), the homogeneity criteria according to the invention is satisfied, during grinding, more rapidly than that relative to the particle size.

A third means is constituted of grinding said mixture so that the average particle size of the primary particles has a predetermined value, comprised of between 0.25 $\mu$m and 1 $\mu$m.

It is evident that, depending on the grades, more or less fine, of the initial raw materials, the grinding work will be longer or shorter. It can be advantageous to provide submicron ferric oxide and to grind it according to the invention to reduce its average particle size by several tenths of a $\mu$m and thus obtain the required average particle size.

In particular, it is necessary to obtain a particle size distribution at the end of grinding, which is unimodal and centred on the average size of the primary particles, and not bi-modal with a population of primary particles and another population of aggregates of primary particles of a size typically 5 to 10 times greater than that of the primary particles.

Thus the grinding tends both to reduce the size of the primary particles down to the required level and also to suppress the aggregates of primary particles.

At the end of grinding, the two criteria, that relative to the degree of homogeneity of $Fe_2O_3$ and of the compound of A, and that relative to the size of the $Fe_2O_3$ particles and of the compound of A, should be fulfilled.

A fourth means is constituted of introducing into said mixture, before or during said grinding, a control agent for checking the microstructure, abbreviated as ACM.

This agent can be incorporated into the crystalline ferrite network during calcination, then precipitated into the grain boundaries, which encourages brittleness according to the observations of the applicant. It can also occur under dispersed form at the surface of the particles or ferrite crystals and thus oppose densification of the ferrite particles during calcination.

Thus, this is also an important means for obtaining a calcinated product under the form of a brittle cake, since it can diminish the cohesion of the particles at the grain boundaries and/or oppose densification during calcination. Tests showed that, in fact, it was possible to act to limit sintering of the primary ferrite particles between themselves during calcination, and thus to diminish the cohesion forces of agglomerates of primary particles.

As will be demonstrated below, the calcination conditions of the ground mixture are not ordinary and they can advantageously be chosen to achieve the aims of the invention.

Only the combination of all these means makes it possible to solve the problem posed and to achieve the aims of the invention, essentially on the one hand a reduction of production and investment costs, especially by reducing the grinding time, and on the other hand the improvement of the magnetic properties through the new possibility of obtaining a more homogeneous ferrite powder with fewer aggregates of primary particles, and finally the possibility of piloting the manufacturing method more closely by intervening on the granulometry of the raw materials just before the calcination stage, and not afterwards as in the classic method.

Furthermore, it should be noted that the significant reduction of time and means for grinding or dispersion after calcination makes it possible to diminish significantly, in the ferrite powders, the $Fe^{2+}$ content resulting from grinding with iron or steel balls according to the traditional process.

DETAILED DESCRIPTION OF THE INVENTION

According to the invention, an ACM additive can be incorporated into said mixture making the $Fe^{3+}$ able to be transported in gaseous phase, during the calcination phase, typically $FeCl_3$, and typically of content comprised between 0.1 and 0.5% by weight of the mixture. This additive is an ACM acting on the densification. According to a hypothesis of the applicant, this additive has the tendency to render inactive the most active sites (sharp edges) and thus to oppose densification of the ferrite material obtained during calcination.

The applicant also found it advantageous, to obtain a brittle cake after calcination, to incorporate as ACM to said mixture, typically with a content comprised between 0.1 and 0.5% by weight of mixture, a volatile oxide able to be substituted to $Fe_2O_3$ or to A, during said calcination, typically $Bi_2O_3$ or $V_2O_5$, or any other volatile oxide, incorporation of said volatile oxide being compensated, in the case of excess charge, by another addition of a bivalent metal substituting for $Fe^{3+}$ to ensure the valency balance.

According to the invention, said mixture can be calcined in two stages:

at a temperature $T_1$ higher than 1225° C., for example, between 1225 and 1275° C., for less than 5 minutes, then at a temperature $T_2$ lower than 1150° C., for example, between 1100 and 1150° C., for at least 30 minutes.

As the applicant noted, calcination for a short period is favourable for producing a brittle cake, but it requires a "perfect" mixture on the scale of each granule in order to limit the risk of having an incomplete reaction or insufficiently crystallised hexaferrite particles, such that the anisotropy of the crystal would not be sufficiently developed.

According to a hypothesis formulated by the applicant, with a two-stage calcination stage according to the invention, the 2nd liquid phase possibly present in low quantity, would be formed above the temperature $T_1$ and would spread over the particles of $Fe_2O_3$, in a very short time, and then, at lower $T_2$, the 2nd liquid phase being solidified, the reaction as well as the crystallisation could continue without modification of the particle size, nor strengthening of the grain boundaries.

But it also possible to operate in a single stage, at a temperature between 1200° C. and 1300° C., and preferably at a temperature between 1220 and 1250° C., for a time lasting between 30 to 90 minutes.

According to the invention, said grinding can be constituted of a dry grinding or comprise a humid phase grinding, the dry or humid grinding being carried out in the presence of metallic or ceramic grinding elements, typically loaded bars or balls or constituted of $ZrO_2$ or tungsten carbide WC, the low contents of Zr or W, typically between 0.05 and 0.5% by weight of said mixture, transferred by wear and rubbing of said bars or balls to said mixture, or added to said mixture, acting, under finely dispersed form, as ACM agent.

Here, a surprising effect was noted by the applicant: it would seem that the Zr or tungsten W counteracts the transport of material from one grain to another, and thus diminishes the risks of sintering. The presence of an ACM also makes it possible to be independent of a divergence of composition relative to stoichiometry, and makes the process more robust by tolerating a little 2nd phase liquid when the ratio n is, for example, between 5.8 and 6. Typically, a first dry grinding is followed by grinding in a grinder with balls and then, after partial elimination of the water, typically by filtration, the filtration cakes are shaped to be put into the calcination oven.

According to another embodiment of the invention, an $Fe_2O_3$ iron oxide with an average particle size comprised between 0.25 and 1 $\mu$m can be provided and in this case, said grinding of stage 2) is suppressed or replaced by a dry mixture or a humid phase dispersion.

In fact, as far as the question of particle size is concerned, the most important is the final distribution of the mixture before calcination and the disappearance of the particle aggregates, whatever the means used to obtain this, whether the reduction of the particle size of ferric oxide particles is carried out within the framework of the process according to the invention or before the supply of ferric oxide.

The ratio n can be taken as equal to 6±0.1. In this case, very little 2nd phase liquid is formed, the excess in A compound being minimum, which is advantageous for the formation of a porous and brittle cake. However, the closer n approaches the theoretical value of 6, the more the mixture must be homogeneous at very small volume, since the constituents of the reaction for ferrite formation must be present locally. The tests carried out by the applicant in fact showed that the incorporation of a grinding stage before that of calcination constituted one of the means making it possible to achieve this result, a result which moreover seemed inaccessible to those skilled in the art.

The ratio n can also be taken as equal to 5.9±0.1 and in this case, besides said mixture, one can incorporate a control agent of particle size (abbreviation ACTP), typically silica, a derivative of silica, or a combination of silica and lime, typically $CaSiO_3$, with a content in equivalent silica comprised between 0.1 and 1% by weight of said mixture.

In fact, the applicant has noted that the more the composition of said mixture departs from the value n=6, the more it is advantageous to introduce an ACTP, in such a way that the calcination phase does not harm significantly the particle size distribution of the primary particles obtained from grinding.

According to another embodiment of the invention process, one can choose the ratio n=5.85±0.15 and as indicated above, it is also advantageous in this case to incorporate an ACTP, in greater quantity than in the above case.

Depending on the value of the ratio n, it will form more or less of 2nd liquid phase, and then it will be necessary to counteract this presence, whether by the nature or the content of the ACTP or the conditions of calcination as such.

Nonetheless, the quantities of ACM and ACTP must be limited, the quantities of ACM (or the corresponding metal or metalloid element remaining after calcination) being preferably lower than 1% by weight in the calcinated cake, and those of ACTP (or the corresponding metal or metalloid element remaining after calcination) being preferably lower than 2% by weight in the calcinated cake.

According to the invention, one can incorporate trivalent products B into said mixture for substituting A, chosen among Bi, La and the rare earths, typically under the form of oxides, and bivalent products C for substituting $Fe^{3+}$ chosen among Ni, Co, Mg, Cd, Cu, Zn; in such a way as to balance the valencies, at a content chosen to form ferrites of formula $A_{1-x}B_xC_xFe_{12-x}O_{19}$, with x typically being between 0.05 and 0.45.

As known in prior art, in order that the incorporation of a product $B^{3+}$ substituting a product $A^{2+}$ in the crystalline network can be possible, it is necessary in particular that the excess charge should be compensated by incorporation of $^{2+}$ions of the type $Ni^{2+}$, $Zn^{2+}$, $Mn^{2+}$, $Co^{2+}$ etc. in the crystalline network, to substitute for the $Fe^{3+}$ ions.

Moreover, the applicant has noted the positive action that at low content, the products B of substitution for A, in particular La, demonstrated an ACM effect. By low content, one means a percentage by weight lower than 1%, or a content which would correspond to x lower than 0.01 in the formula $A_{1-x}B_xC_xFe_{12-x}O_{19}$. But, in this case, according to the applicant, at least after cooling, the product B would not be integrated into the crystalline network but would concentrate in the grain boundaries, thus a possible action such as ACM.

Another aim of the invention comprises the hexaferrite cake obtained by the process according to the invention, which shows an apparent density lower than 3 and whose primary particles have an average particle size comprised between 0.25 and 1 $\mu$m. The apparent density is that obtained from the corresponding mass at a given macroscopic volume.

A further aim of the invention is the fine hexaferrite powder obtained by dispersion of the hexaferrite cake obtained according to the invention.

Another aim of the invention comprises the magnets obtained from the fine hexaferrite powder obtained according to the invention.

A further aim comprises the magnetic recording media obtained from the powder obtained according to the invention.

EXAMPLES OF EMBODIMENTS

In all the tests, both tests according to the invention and comparative tests outside the invention, cakes and fine powders of ferrite were made and measurements carried out according to the following conditions common to all the tests:

a) The raw materials:
the $Fe_2O_3$ powder is a powder obtained by the Ruthner method and of average particle size of 0.8 µm (Fisher test);
the $SrCO_3$ powder (component of A of the invention) is a powder of average particle size of 1.5 µm (supplier: Solvay grade A);
when an ACTP was used, $CaSiO_3$ was used.

b) The grinding made before calcination according to the invention was carried out for the time needed to produce an average particle size of 0.6 µm (Fisher test). The grinding was carried out in humid phase (apart from test 10 which was dry) with grinding balls. The test table indicates the diameter and nature of the balls. For tests 1 to 15 as a whole, the length of grinding time taken to achieve the particle size of 0.6 µm and the level of homogeneity required was typically between 1 and 2 hours. Under the grinding conditions of the tests (tests 1 to 15), it was noted that the test according to the invention related to the degree of homogeneity of the mixture was satisfied before the particle size of 0.6 µm was achieved.

c) The microstructure control agent ACM was indicated, in nature and content, in the test table. In many cases, media or grinding elements were used constituted of or comprising said ACM, in such a way that, by normal abrasion, a low quantity of ACM was deposited at the surface of the ferrite crystals.

d) Calcination was carried out in air in a gas oven ($O_2$ content of 9%) at a temperature $T_c$ specified in the test table, for 1 hour unless otherwise indicated.

e) Transformation of a calcinated ferrite into a fine ferrite powder usable for forming magnets: the calcinated ferrite was ground in an Attritor (R) grinder of laboratory type operating continuously for the time needed to obtain a BET specific surface area of 10 m²/gm. This time is shown as a measurement of brittleness in the table of results.

In fact, in the method according to the present state of the art, this transformation is a grinding with reduction of the particle size of the ferrite particles, carried out with iron balls for a specified time, whereas according to method of the invention, this transformation is first of all a dispersion of the brittle cake obtained, which thus leads to a relatively low level of smalls content.

f) The measurements taken:
the apparent density $d_a$ was measured with a porosimeter with silica balls: since the silica balls do not enter the pores of the cake, a density envelope is measured.
as mentioned above, the brittleness F of the cake was evaluated using a grinding test: the time (h) was measured, needed to obtain a BET granulometry of 10 m²/gm by grinding calcinated ferrite in a laboratory grinder of the Attritor (R) type operating continuously.
the specific magnetisation Ms (A.m²/kg) was measured under a field of 2 Tesla, by the method of extraction in zero field. This makes it possible to evaluate the quantity of M phase, that is to say the transformation yield of raw materials in M.
the value of the coercive field HcJ of ferrites in the form of cakes obtained after calcination was measured with a coercimeter; this makes it possible to have an idea of the fineness of grains in the cake: the higher the value of HcJ, the finer the grain size.
the content in $Fe^{2+}$, Cl and Zr, W were obtained by methods for humid chemistry measurement, and those of Bi, La, Co and Zn by X-ray fluorescence.
the values of residual magnetism Br and of the coercive field HcJ for magnets manufactured from fine ferrite powder were measured according to the IEC standard 404-5, the magnets having a cylindrical form (phi=30 mm and e=8 mm) obtained by compression of the paste at BET=10 m²/gm, under a pressure P=30 MPa (300 kg/cm²) and under an axial field of 1 Tesla, followed by electric sintering in air at 1235° C. for a maturing time of 1 hour at this temperature.
the index IP is a performance index calculated by the formula "IP=Br+0.5.HcJ in SI units", which makes it possible to compare the relative results, independently of the balance between Br and HcJ, which is governed both by the additives and by the calcination conditions.

TEST TABLES

| No Test | n | Other components. weight % | ACTP wt % | Grinding (Inv.) media/ size | Tc ° C. | Grinding (EdT) media/ size | ACM wt % |
|---|---|---|---|---|---|---|---|
| A | 5.55 | — | 1 | — | 1290° | balls Fe/4 mm | — |
| B | 6.0 | $La_2O_3$ = 5.2% $Co_3O_4$ = 2.3% | — | — | 1230° | balls Fe/4 mm | — |
| C | 6.0 | $La_2O_3$ = 5.2% ZnO = 2.3% | — | — | 1230° | balls Fe/4 mm | |
| 1 | 5.85 | — | 1 | balls WC/4 mm | 1230° | — | W 0.1 |
| 2 | 5.85 | — | — | balls $ZrO_2$/4 mm | 1250°-3 min in 1140°-60 min | — | Zr 0.4 |
| 3 | 5.85 | — | 1 | balls Fe/4 mm | 1240° | — | — |
| 4 | 6.0 | — | — | balls $ZrO_2$/4 mm | 1230° | — | Zr 0.4 |
| 5 | 5.85 | — | — | balls Fe/4 mm | 1250°-3 min in 1140°-60 min | — | — |
| 6 | 5.90 | — | 1 | balls $ZrO_2$/4 mm | 1230° | — | Zr |

-continued

TEST TABLES

| No Test | n | Other components. weight % | ACTP wt % | Grinding (Inv.) media/ size | Tc ° C. | Grinding (EdT) media/ size | ACM wt % |
|---|---|---|---|---|---|---|---|
| 7 | 5.55 | — | 2 | balls Fe/4 mm | 1230° | — | 0.4 — |
| 8 | 5.85 | — | — | balls $ZrO_2$/4 mm | 1230° | — | $FeCl_3$/$ZrO_2$ 0.4/0.4 |
| 9 | 6.0 | — | — | balls Fe/4 mm | 1250° | — | — |
| 10 | 5.85 | — | 1 | balls $ZrO_2$/20 mm dry grinding | 1230° | — | Zr 0.4 |
| 11 | 6.10 | $Bi_2O_3$/Zr | — | balls $ZrO_2$/4 mm | 1230° | — | 0.4/0.4 |
| 12 | 5.95 | — | — | balls Fe/4 mm | 1290° | — | — |
| 13 | 5.85 | — | 1 | balls Fe/20 mm dry grinding | 1130° | — | — |
| 14 | 6.0 | $La_2O_3$ = 5.2% $CO_3O_4$ = 2.3% | — | balls $ZrO_2$/4 mm | 1230° | — | Zr 0.2 |
| 15 | 6.0 | $La_2O_3$ = 5.2% ZnO = 2.3% | — | balls $ZrO_3$/4 mm | 1230° | — | Zr 0.2 |

Notes:
ACM and ACTP are expressed in weight percentage of the mixture (non calcinated).
for tests B and 14, the weight percentages in La and Co in the calcinated cake are respectively 3.9% and 1.6%
for tests C and 15, the weight percentages in La and Zn in the calcinated cake are respectively 3.9% and 1.7%.

for dispersion of the cake, that is a total of about 16 hours which, even taking into account the product transfers, ensures a gain in productivity of at least 10%, a very important gain for an industrial process.

Furthermore, these tests show an improvement in performance and magnetic properties of the magnets obtained with fine ferrite powders according to the invention.

Results obtained

| Test No. (mT) | Brittleness $d_2$ | (F(h)) | Ms $Am^2$/kg | HcJ kA/m | Porosity % | $Fe^{2+}$ % | magnetic props. Br(mT) | HcJ(kA/m) | IP(mT) |
|---|---|---|---|---|---|---|---|---|---|
| A | 4.32 | 20 | 68.1 | 272 | 16 | 2.7 | 410 | 270 | 545 |
| B | 4.14 | 22 | 68.4 | 375 | 22 | 2.6 | 412 | 346 | 585 |
| C | 4.12 | 21 | 69.5 | 252 | 21 | 2.3 | 421 | 192 | 517 |
| 1 | 2.72 | 14 | 68.1 | 332 | 43 | 0.3 | 418 | 293 | 564 |
| 2 | 2.72 | 14 | 68.1 | 332 | 44 | 0.1 | 420 | 292 | 566 |
| 3 | 2.72 | 32 | 68.1 | 332 | 44 | 0.1 | 401 | 188 | 495 |
| 4 | 2.65 | 13 | 68.4 | 330 | 48 | 0.3 | 420 | 296 | 568 |
| 5 | 2.20 | 6 | 59.1 | 253 | 55 | 0.1 | 382 | 193 | 479 |
| 6 | 2.80 | 14 | 68.3 | 331 | 45 | 0.3 | 418 | 293 | 564 |
| 7 | 2.30 | 8 | 64.1 | 350 | 55 | 0.2 | 385 | 210 | 490 |
| 8 | 2.68 | 14 | 68.4 | 342 | 47 | 0.3 | 419 | 290 | 564 |
| 9 | 3.48 | 18 | 66.9 | 285 | 32 | 1.3 | 420 | 210 | 525 |
| 10 | 2.72 | 15 | 68.1 | 332 | 43 | 0.3 | 419 | 294 | 566 |
| 11 | 2.70 | 13 | 68.2 | 325 | 47 | 0.3 | 420 | 298 | 569 |
| 12 | 4.10 | 21 | 68.1 | 265 | 19 | 0.3 | 405 | 268 | 539 |
| 13 | 2.3 | 6 | 57.6 | 355 | 55 | 0.1 | 378 | 200 | 478 |
| 14 | 2.73 | 12 | 68.5 | 395 | 48 | 0.3 | 421 | 362 | 602 |
| 15 | 2.84 | 12 | 69.2 | 231 | 46 | 0.3 | 432 | 182 | 523 |

Tests 3, 5, 7, 9, 12 and 13 are comparative tests carried out within the framework of the invention, but they do not belong to the invention since they lack at least one of the essential means of the invention.

CONCLUSIONS FROM THE TESTS

To begin with, it can be noted that there is a significant gain in overall time for grinding or dispersion between the invention and the present state of the art. In fact, within the framework of the tests carried out, an average grinding time of the order of 22 hr according to the state of the art corresponds to an average grinding time of 2 hr plus 14 hr

ADVANTAGES OF THE INVENTION

Among the advantages of the invention, besides those corresponding to the solution of the problem posed, two points should be emphasised in particular:
on the one hand, the process according to the invention makes it possible to eliminate the presence of smalls in the ferrite powder, smalls being all the particles of size smaller than the minimum size required of 0.3 $\mu$m.

In fact, the smalls obtained in the state of the art powders result from grinding after calcination, and the difficulty, if not the impossibility, of separating the smalls from the ferrite particles.

On the contrary, with the process according to the invention, the $Fe_2O_3$ particle smalls, which were able to form during grinding before calcination, necessarily disappeared during calcination taking into account their higher reactivity.

on the other hand, the process according to the invention makes it possible to limit the $Fe^{2+}$ ion content to a low value, this ion having a negative effect on the final magnetic properties. But, with grinding according to the present state of the art, typically grinding with iron or steel balls, the $Fe^{2+}$ ion content in the ferrite powder is much higher, and typically twice as high, which considerably increases the final magnetic properties, IP in particular. The increase in IP is evaluated at +20 mT for the non-substituted Sr ferrites, also at +20 mT for La and Co substituted ferrites, and at +6 mT for La and Zn substituted ferrites.

What is claimed is:

1. Method for manufacturing M type hexaferrites of formula $AFe_{12}O_{19}$ where A is a metal selected from the group consisting of Ba, Sr, Ca, Pb and mixtures thereof, comprising the steps of:

a) mixing iron oxide $Fe_2O_3$ and an A compound with a molar ratio $n=Fe_2O_3/AO$ of between 5.7 and 6.1, simultaneously with said mixing or subsequently thereto, grinding said mixture to an average particle size between 0.25 and 1 $\mu$m, with a predetermined degree of homogeneity, and simultaneously with of before said grinding, adding to said mixture a microstructure controlling agent;

b) shaping said ground mixture in the form of agglomerates of shape and size adapted to calcination, and calcining the shaped mixture in an oven at between 1100° C. and 1300° C., in such a way as to form M type ferrite material in the form of a porous cake having:
      a transformation yield in crystallized M ferrite greater than 95%,
      an apparent density $d_a$ lower than 3.5, or a porosity higher than 30%, and
      low cohesion energy at grain boundaries between primary particles leading to high brittleness; and c) optionally grinding or dispensing by simple dispersion said porous cake to form a fine powder.

2. Process according to claim 1 wherein said agent comprises an additive allowing the transport of $Fe^{3+}$ in gaseous phase during the calcination.

3. Process according to claim 2, wherein the agent comprises $FeCl_3$ in an amount of between 0.1 and 0.5% by weight of mixture.

4. Process according to claim 1, wherein the agent comprises a volatile oxide capable of substituting for $Fe_2O_3$ or A during said calcination, the incorporation of said volatile oxide being compensated, in the case of excess charge, by another addition of a bivalent metal substituting for $Fe^{3+}$ to ensure the valency balance.

5. Process according to claim 4, wherein the agent comprises $Bi_2O_3$ or $V_2O_5$ in an amount between 0.1 and 0.5% by weight of mixture.

6. Process according to claim 1, wherein said mixture is calcined:
   either in two stages: at a temperature, between 1225° C. and 1275° C. for less than 5 minutes, then at a temperature comprised between 1100° C. and 1150° C. for at least 30 minutes;
   or in a single stage at a temperature between 1200° C. and 1300° C., for a time between 30 and 90 minutes.

7. Process according to claim 1, wherein said grinding comprises a dry grinding or a humid phase grinding, the dry or humid phase grinding being carried out in the presence of metallic or ceramic grinding elements.

8. Process according to claim 7, wherein the grinding elements comprise bars or balls loaded with or formed from $ZrO_2$ or tungsten carbide WC, having a content of Zr or W of between 0.05 and 0.5% by weight of said mixture, and transferred by wear and rubbing of said bars or balls to said mixture, or added to said mixture, acting under finely dispersed form as said agent.

9. Process according to claim 1, wherein said iron oxide $Fe_2O_3$ has an average particle size between 0.25 and 1 $\mu$m.

10. Process according to claim 1, additionally comprising incorporating into said mixture a particle size control agent.

11. Process according to claim 10, wherein the particle size control agent comprises silica, calcium oxide, a derivative of silica, or a combination of silica and calcium oxide, with a content in equivalent silica of between 0.1 and 1% by weight of said mixture.

12. Process according to claim 1, wherein n is equal to 6±0.1.

13. Process according to claim 1, wherein is equal to 5.9±0.1.

14. Process according to claim 1, wherein n is equal to 5.85±0.15.

15. Process according to claim 1, additionally comprising incorporating into said mixture substitution trivalent products B for A, and substitution bivalent products C for $Fe^{3+}$, B and C being chosen in such a way as to balance the valencies, and with a content chosen to form ferrites of formula $A_{1-x}B_xC_xFe_{12-x}O_{19}$, with x between 0.05 and 0.45.

16. Process according to claim 15, wherein B is selected from the group consisting of Bi, La and rare earths, and C is selected from the group consisting of Ni, Co, Mg, Cd, Cu and Zn.

17. Hexaferrite cake having an apparent density lower than 3 and an average particle size between 0.25 and 1 $\mu$m, obtained by the process according to claim 1.

* * * * *